US008654149B2

(12) United States Patent
He

(10) Patent No.: US 8,654,149 B2
(45) Date of Patent: Feb. 18, 2014

(54) SYSTEM AND METHOD FOR DISPLAYING ENHANCED VISION AND SYNTHETIC IMAGES

(75) Inventor: Gang He, Morristown, NJ (US)

(73) Assignee: Honeywell International Inc., Morristown, NJ (US)

(*) Notice: Subject to any disclaimer, the term of this patent is extended or adjusted under 35 U.S.C. 154(b) by 247 days.

(21) Appl. No.: 13/331,632

(22) Filed: Dec. 20, 2011

(65) Prior Publication Data
US 2013/0155093 A1 Jun. 20, 2013

(51) Int. Cl.
G09G 5/00 (2006.01)

(52) U.S. Cl.
USPC .......................................................... 345/632

(58) Field of Classification Search
None
See application file for complete search history.

(56) References Cited

U.S. PATENT DOCUMENTS

| 7,196,329 | B1 | 3/2007 | Wood et al. | |
|---|---|---|---|---|
| 7,605,719 | B1 | 10/2009 | Wenger et al. | |
| 7,747,364 | B2 | 6/2010 | Roy et al. | |
| 7,852,236 | B2 | 12/2010 | Feyereisen et al. | |
| 7,965,202 | B1 | 6/2011 | Chiew et al. | |
| 8,010,245 | B2 | 8/2011 | Nichols et al. | |
| 8,099,234 | B1* | 1/2012 | Frank et al. | 701/436 |
| 8,249,806 | B1* | 8/2012 | McCusker | 701/457 |
| 8,462,019 | B1* | 6/2013 | VanDerkamp et al. | 340/972 |
| 2006/0227014 | A1* | 10/2006 | Gannon | 340/972 |
| 2009/0040070 | A1* | 2/2009 | Alter et al. | 340/945 |
| 2010/0030405 | A1 | 2/2010 | He et al. | |
| 2010/0207845 | A1* | 8/2010 | Pal et al. | 345/7 |
| 2011/0210871 | A1 | 9/2011 | Flotte et al. | |
| 2011/0227944 | A1* | 9/2011 | Feyereisen et al. | 345/632 |
| 2012/0026190 | A1* | 2/2012 | He et al. | 345/633 |
| 2012/0035789 | A1* | 2/2012 | He | 701/16 |
| 2012/0056759 | A1* | 3/2012 | He et al. | 340/960 |

OTHER PUBLICATIONS

Honeywell's Augmented-Reality Display (Almost) Gives Pilots X-Ray Specs: http://www.fastcodesign.com/1663491/honeywells-augmented-reality-display-almost-gives-pilots-x-ray-specs[Oct. 14, 2011 7:51:34 AM].
NASA Funds ESVS Research/Aviation International News: http://www.ainonline.com/?q=aviation-news/aviation-international-news/2010-11-30/nasa-funds-esvs-research[Oct. 14, 2011 7:57:30 AM].

* cited by examiner

Primary Examiner — Aaron M Richer
Assistant Examiner — Mohammad H Akhavannik
(74) Attorney, Agent, or Firm — Ingrassia Fisher & Lorenz, P.C.

(57) ABSTRACT

A vehicle display system displays enhanced vision images augmented with selected features of synthetic vision images that correspond to features of the enhanced vision images. The selection of the features may be predetermined, made by the pilot, or based on the operational status of the aircraft.

19 Claims, 5 Drawing Sheets

SYSTEM AND METHOD FOR DISPLAYING ENHANCED VISION AND SYNTHETIC IMAGES

TECHNICAL FIELD

The exemplary embodiments described herein generally relate to display systems and more particularly to a display system and method for augmenting enhanced vision images with synthetic vision system images.

BACKGROUND

Many vehicles, such as aircraft, are commonly equipped with one or more vision enhancing systems to convey flight path and/or flight management information. Such vision enhancing systems are designed and configured to assist a pilot when flying in conditions that diminish the pilot's view from the cockpit, such as, but not limited to, darkness and weather phenomenon. One example of a vision enhancing system is known as a synthetic vision system (hereinafter, "SVS") and may be more generally described as a being a dynamic condition subsystem of the aircraft. An example of a synthetic vision system is disclosed in U.S. Pat. No. 7,352, 292. Additionally, an exemplary synthetic vision system is available for sale in the market place under product name SmartView, manufactured by Honeywell International, Inc.

A typical SVS is configured to work in conjunction with a position determining unit associated with the aircraft as well as with dynamic sensors that sense the aircraft's altitude, heading, and attitude. The SVS typically includes a database containing information relating to the topography along the aircraft's flight path. The SVS receives inputs from the position determining unit indicative of the aircraft's location and also receives inputs from the dynamic sensors on board the aircraft indicative of the aircraft's heading, altitude, and attitude. The SVS is configured to utilize the position, heading, altitude, and orientation information and the topographical information contained in its database, and generate a three-dimensional image that shows the topographical environment through which the aircraft is flying from the perspective of a person sitting in the cockpit of the aircraft. The three-dimensional image may be displayed to the pilot on any suitable display unit accessible to the pilot. Using an SVS, the pilot can look at the display screen to gain an understanding of the three-dimensional topographical environment through which the aircraft is flying and can also see what lies ahead. One advantage of the SVS is that its image is clean and is not obstructed by any weather phenomenon.

For example, referring to FIG. 1, an image 100 created from the pre-stored database information may include flight management data 102, e.g., heading, altitude, and speed, superimposed on a synthetic rendering of terrain 104 and objects such as a runway 106 and a taxiway 108, some of which may be of a range for detection by an EVS system or not clearly shown in an EVS images. Thus, SVS images can provide the vehicle operator with an effective interface for vehicle control. SVS image integrity, however, is limited by the integrity of the information pre-stored in the database. Accordingly, incomplete and/or outdated database information can result in SVS images of limited value.

Another example of a vision enhancing system is known as an enhanced vision system (hereinafter, "EVS") and may be more generally described as being a sensor subsystem. Examples of enhanced vision systems are disclosed in U.S. Pat. Nos. 7,655,908 and 5,317,394. Additionally, an exemplary enhanced vision system is available for sale in the market place under product name EVS-II, manufactured by Kollsman, Inc. A typical EVS includes an imaging device, such as, but not limited to, a visible lowlight television camera, an infrared camera, or any other suitable light detection system capable of detecting light or electromagnetic radiation, either within or outside of the visible light spectrum. Such imaging devices are mounted to the aircraft and oriented to detect light transmissions originating from an area outside of the aircraft and are typically located ahead of the aircraft in the aircraft's flight path. The light received by the EVS is used by the EVS to form an image that is then displayed to the pilot on any suitable display in the cockpit of the aircraft. The sensor used in an EVS is more sensitive to light than is the human eye. Accordingly, using the EVS, a pilot can view elements of the topography that are not visible to the human eye. For this reason, an EVS is very helpful to a pilot when attempting to land an aircraft in inclement weather or at night. One advantage to an EVS system is that it depicts what is actually present versus depicting what is recorded in a database.

FIG. 2 is an EVS image 200 showing a runway 202, a taxiway 204, and various other objects around the airport, such as buildings 206 and roads 208. FIG. 2 also includes dark areas, providing little thermal output, such as the sky 210 and terrain 212. Although image processing can improve image quality, the images presented to the vehicle operator still may be insufficient.

Some display systems display both an SVS image and an EVS image display. For example, as a fused (merged) image (such as overlaying an EVS image onto an SVS image) or as a side-by-side display. The images may be indexed at the time of camera installation, e.g., by aligning an EVS image sensor to ensure that the sensor and the SVS view are indexed. Such a process may be periodically repeated during normal course of maintenance to assure proper alignment. Although such an overlaid "enhanced synthetic vision system" display may be useful, the display can be confusing, noisy, and difficult to interpret. For example, pixel averaging or alpha blending between SVS and EVS images can result with views being obscured with noisy or non-useful information, making it difficult for the pilot to interpret the information encoded on the display.

In addition to the above described vision systems, additional images, in the form of symbology, are typically presented to the pilot on the same display screen where the images from the EVS and the SVS are displayed. The symbology commonly appears as an icon or a series of icons on the display screen and may be indicative of the aircraft's heading, direction, attitude, and orientation. Such symbology serves an important role in providing the pilot with situational awareness and controls concerning the orientation and attitude of the aircraft. This symbology is traditionally overlaid over the image presented by the SVS and the EVS.

Accordingly, it is desirable to provide an apparatus and method for displaying combined SVS, EVS images, in addition to data symbology that are relatively easy to interpret. Furthermore, other desirable features and characteristics of exemplary embodiments will become apparent from the subsequent detailed description and the appended claims, taken in conjunction with the accompanying drawings and the foregoing technical field and background.

BRIEF SUMMARY

Display systems and methods for augmenting enhanced vision images with synthetic vision images are provided.

A first exemplary embodiment of a display system for displaying images includes an enhanced vision system configured to generate a stream of enhanced vision images, each enhanced vision image comprising a plurality of enhanced features; a synthetic vision system database configured to generate a stream of synthetic vision images, each synthetic vision image comprising a plurality of synthetic features; a processor coupled to the enhanced vision system and the synthetic vision system and configured to select a portion of the synthetic features; and align the portion of selected synthetic features and the enhanced vision images; and a display coupled to the processor and configured to display the aligned enhanced vision images and the selected synthetic features.

A second exemplary embodiment includes an enhanced vision system configured to generate enhanced vision images; a synthetic vision database containing information regarding lighting for a landing approach path of the aircraft; a synthetic vision system configured to obtain information from the synthetic vision database for generating synthetic vision images of the lighting based on flight conditions of the aircraft; a processor coupled to the enhanced vision system and the synthetic vision system and configured to select a portion of the synthetic features; and a display configured to display the enhanced vision images and the selected portion of the synthetic images.

A third exemplary embodiment includes the method for displaying images to an aircrew member of an aircraft, including generating enhanced vision system images, each comprising a plurality of enhanced features; generating synthetic vision system images, each comprising a plurality of synthetic features; selecting a portion of the synthetic features; and displaying the enhanced vision system images and the selected portion of the synthetic features.

BRIEF DESCRIPTION OF THE DRAWINGS

The exemplary embodiments will hereinafter be described in conjunction with the following drawing figures, wherein like numerals denote like elements.

DETAILED DESCRIPTION

Figure 1:
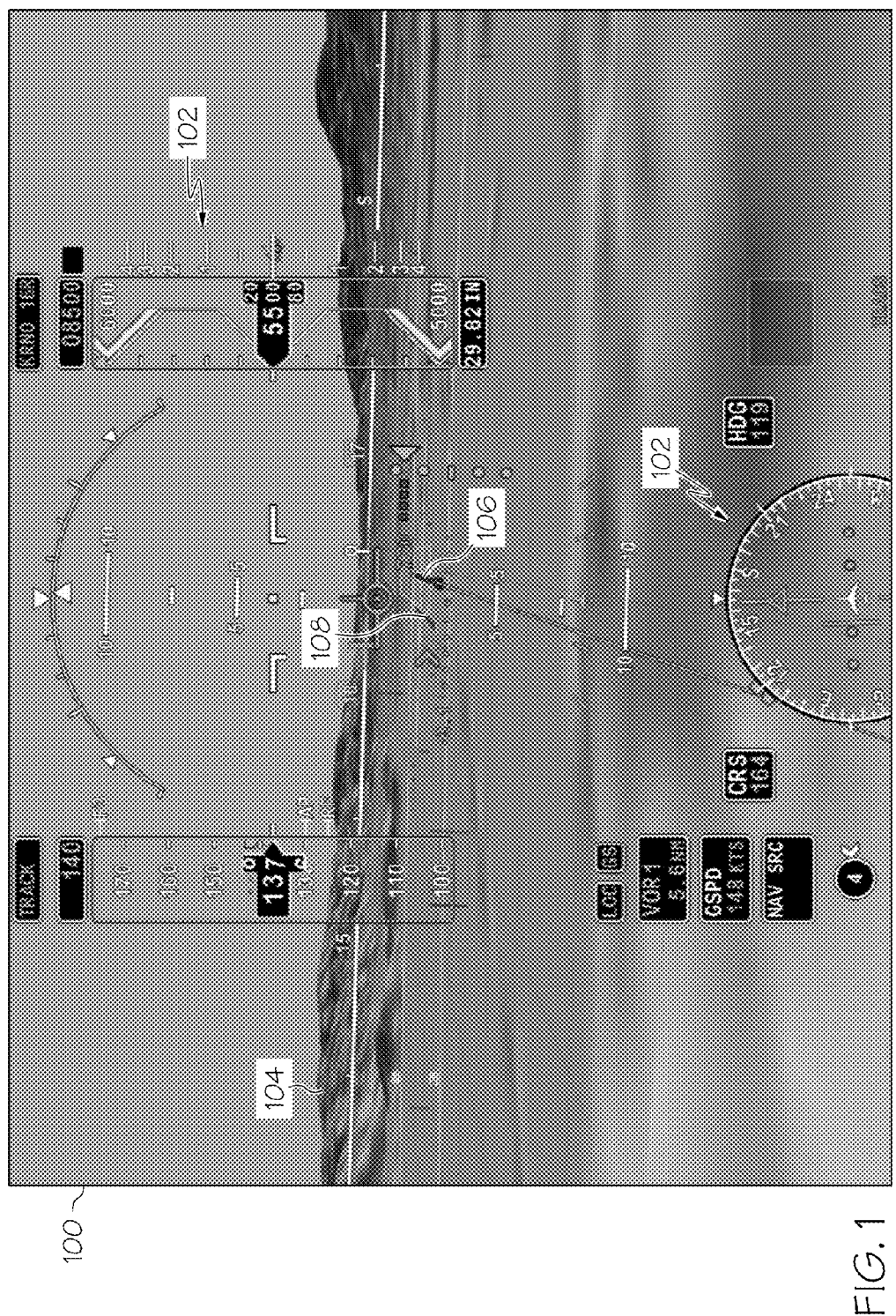
FIG. 1 is a display of a known enhanced vision image.
Figure 2:
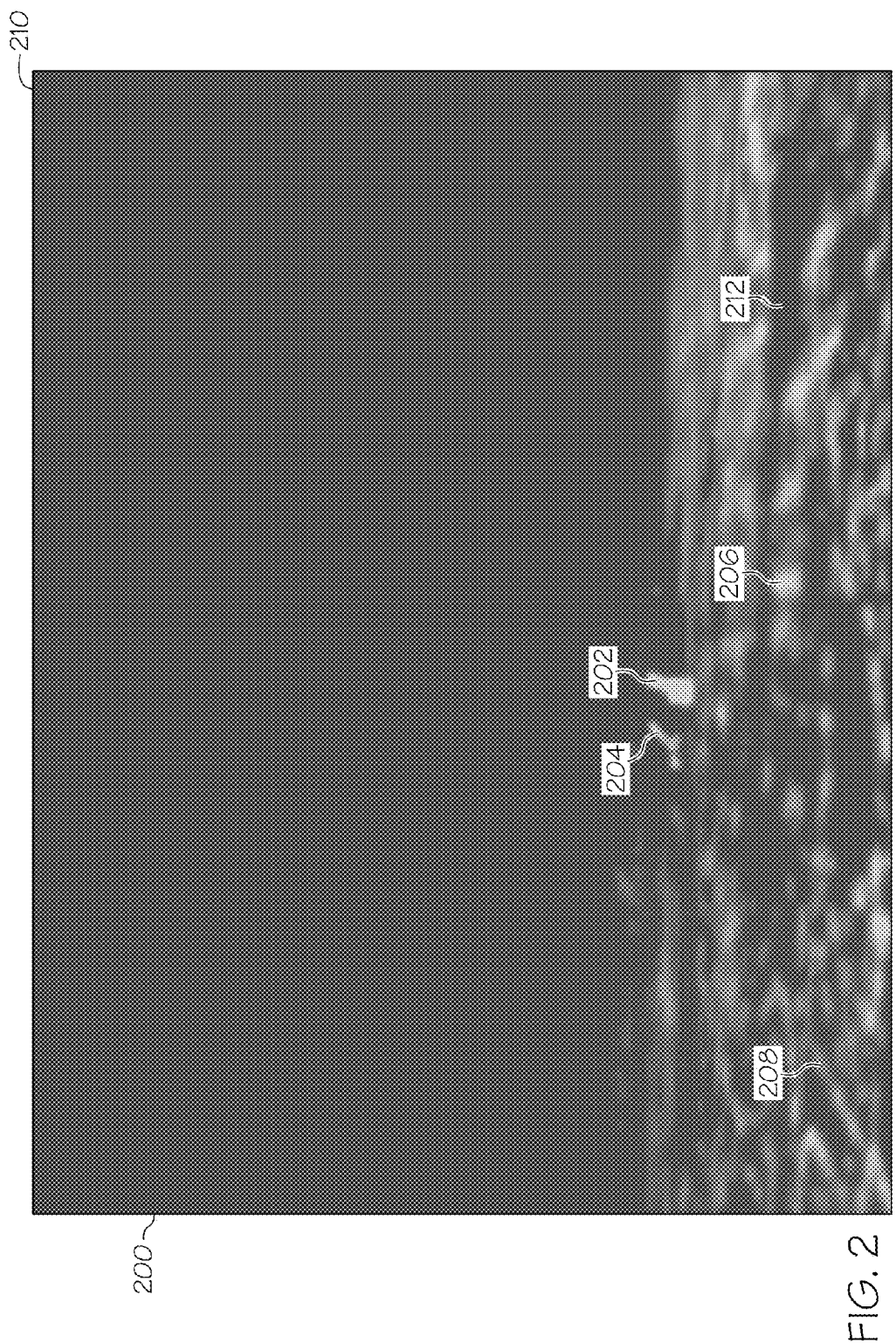
FIG. 2 is a display of a known synthetic vision image.

The following detailed description is merely exemplary in nature and is not intended to limit the application and uses. Furthermore, there is no intention to be bound by any theory presented in the preceding technical field, background, brief summary, or the following detailed description.

Improved systems and methods for displaying images to a pilot of an aircraft during flight are disclosed. Images generated by an EVS and augmented by SVS images having selected features are presented to a pilot together in a manner that permits the pilot to discern the image generated and anticipate future events when the image data are not yet available on the imaging sensors. The system is configured to augment the EVS image with selected portions of the SVS images.

The system is configured to operate by displaying selected features, such as grid lines, certain textures, or center approach path features from the SVS image onto the EVS image. The display characteristics are different for the SVS portion and the EVS portion. The features on the EVS image portion being augmented are adaptively adjusted, e.g., the augmentation lines from the SVS image may be less bright when the EVS image is darker. Features from the SVS image may be omitted when the EVS image adequately displays features related to the operational status.

Although embodiments described herein are specific to aircraft display systems, it should be recognized that principles of the inventive subject matter may be applied to other vehicle display systems.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The following detailed description is merely exemplary in nature and is not intended to limit application and uses. Furthermore, there is no intention to be bound by any theory presented in the preceding background or the following detailed description.

Figure 3:
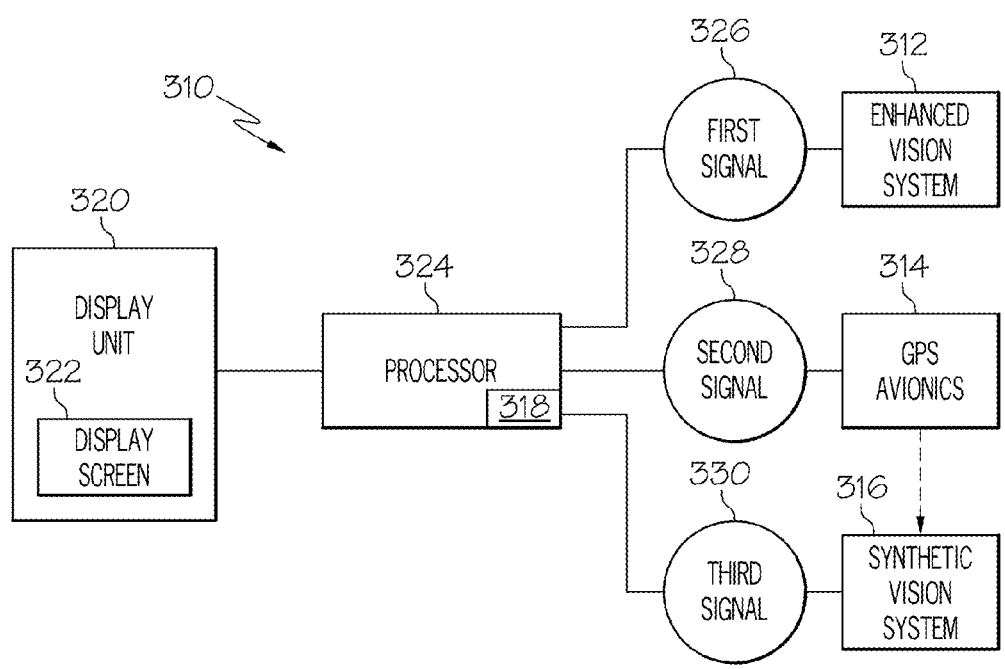
FIG. 3 is a block diagram of a vehicle display system for generating SVS and EVS display images in accordance with an exemplary embodiment.

FIG. 3 is a simplified functional block diagram illustrating a system 300 for displaying multiple overlaid images to a pilot of an aircraft during flight. System 300 includes multiple components each of which may be configured for mounting to aircraft. In some embodiments, system 300 may be a self-contained system such that each of the components described below are contained in a single housing and are dedicated exclusively to serving the functions of system 300, while in other embodiments, the various components described below may be standalone components or they may be components that are used as part of other systems and which are configured to be used as a shared resource between such other systems and system 300.

In the embodiment illustrated in FIG. 3, system 300 includes an enhanced vision system 312 (EVS), a Global Positioning System and avionics sensors 314, an image decisioner 318, a synthetic vision system 316 (SVS), a display unit 320, a display screen 322, and a processor 324. In equivalent embodiments, system 300 may include either additional or fewer components.

EVS 312 includes one or more sensors adapted for mounting to an aircraft and configured to detect a light signature originating from outside the aircraft. The sensor may include a visible low light television camera, an infrared camera, and millimeter wave (MMW) camera or any other light sensing device capable of detecting light either within, or outside of the visible spectrum. The light signature may include any light that is projected from, or that is reflected off of any terrain or object outside of the aircraft. In one application, the light signature includes, but is not limited to, signature components from lights that are positioned adjacent to a runway and which are pointed to facilitate approach runway position and bearing identification.

EVS 312 is configured to generate a first signal 326 and to provide first signal 326 to processor 324. First signal 326 is an electronic signal that includes information corresponding to the light signature detected by EVS 312 and which would enable processor 324 to render an image of the light signature (referred to hereinafter as "the EVS image"). For example, if the detected light signature includes components of a distant runway and runway approach lights adjacent to the runway, first signal 326 would enable processor 324 to render an image of the distant runway and the adjacent runway approach lights. In some embodiments, EVS 312 may include a dedicated processor, a microprocessor, circuitry, or some other processing component that is configured to receive input from the one or more light detecting sensors and to generate first signal 326 using such inputs. In other embodiments, EVS 312 may not include a dedicated processor, microprocessor, circuitry or other processing component, in which case the first signal 326 would comprise unprocessed inputs from the light detecting sensors of EVS 312 for processing by processor(s) 324.

SVS 316 is configured to generate a three-dimensional image of the topographical environment around the aircraft (referred to hereinafter as "the SVS image") generate a third signal 330 carrying SVS image and to provide the third signal 330 to processor 324. In some embodiments, SVS 316 may include a data storage device (not shown) containing a database with data relating to the topography, which may represent either or both landscape and/or man-made structures located along the aircraft's flight path. In some embodiments, the data storage device may contain such data for an entire geographical region such as a state, a country or continent. SVS 316 may also access or include a position determining unit that is configured to determine the position of the aircraft with respect to the surface of the earth. Such a position determining unit may include, but is not limited to, a GPS system, an inertial navigation system, and the like. SVS 316 may be configured to receive course, speed and other avionics inputs relating to the aircraft's heading, altitude and attitude. In equivalent embodiments, SVS 316 may receive the GPS and avionics inputs from the aircraft's GPS and avionics sensors 314.

In some embodiments, SVS 316 may include a dedicated processor, microprocessor, or other circuitry that is configured to take the information pertaining to the position, attitude, altitude and heading of the aircraft and to utilize the information available in the database to generate a third signal 330 that may be utilized by processor 324 to render a three-dimensional image of the topographical environment through which the aircraft is flying. In other embodiments, SVS 316 may not include a dedicated processor, microprocessor or other circuitry. In such embodiments, third signal 330 would contain the unprocessed sensor information and location data which could then be utilized by processor 324 to render the three dimensional image of the topographical environment. In either event, SVS 316 is configured to provide third signal 330 to processor 324.

The display 320 is configured to provide the enhanced images to the operator. In accordance with an exemplary embodiment, the display 320 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 320 additionally be implemented as a panel mounted display, a HUD (head-up display) projection, or any one of numerous known technologies. It is additionally noted that the display 320 may be configured as any one of numerous types of aircraft flight deck displays. For example, it may be configured as a multi-function display, a horizontal situation indicator, or a vertical situation indicator. In the depicted embodiment, however, the display 320 is configured as a primary flight display (PFD).

Additionally, display unit 320 includes a display screen 322 that is operatively connected to display unit 320. Display screen 322 is configured to be controlled by display unit 320 and may be used to display any type of image including, but not limited to, graphics and text. In some embodiments, display unit 320 may include multiple display screens 322 and system 300 may include multiple display units 320.

Processor 324 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 324 may comprise a single processor or a plurality of processors acting in concert. In some embodiments, processor 324 may be dedicated for use exclusively with system 300 while in other embodiments processor 324 may be shared with other systems on board the aircraft. In still other embodiments, processor 324 may be integrated into any of the other components of system 300. For example, in some embodiments, processor 324 may be a component of SVS 316 or of EVS 312.

Processor 324 is communicatively coupled to EVS 312, GPS/avionics sensors 314, and SVS 316, and is operatively coupled to display unit 320. Such communicative and operative connections may be effected through the use of any suitable means of transmission, including both wired and wireless connections. For example, each component may be physically connected to processor 324 via a coaxial cable or via any other type of wired connection effective to convey electronic signals. In other embodiments, each component may be communicatively connected to processor 324 across a bus or other similar communication corridor. Examples of suitable wireless connections include, but are not limited to, a Bluetooth connection, a Wi-Fi connection, an infrared connection or the like.

Being communicatively and/or operatively coupled with EVS 312, GPS/avionics sensors 314, SVS 316, and display unit 320, provides processor 324 with a pathway for the receipt and transmission of signals, commands, instructions, and interrogations to and from each of the other components. Processor 324 is configured (i.e., loaded with and being capable of executing suitable computer code, software and/or applications) to interact with and to coordinate with each of the other components of system 300 for the purpose of overlaying images corresponding to first signal 326 and third signal 330. For example, in the illustrated embodiment, processor 324 is configured to receive third signal 330 from SVS 316 and to send a command to display unit 320 instructing display unit 320 to display portions of a corresponding SVS image on a display screen 322. Processor 324 may also be configured to receive a second signal 328 from the aircraft's GPS/Avionics system 314 for displaying data in an iconic format.

Processor 324 is also configured to receive first signal 326 from EVS 312 and to send a command to display unit 320 instructing display unit 320 to display the EVS image on display screen 322. Processor 324 is further configured to command display unit 320 to overlay the semi-transparent EVS image on top of selected portions of the SVS image.

Processor 324 is in operable communication with the image decisioner 318. Image decisioner 318 may be a suitably configured and programmed computing device or in equivalent embodiments may be a software module executing on the processor 324. In other embodiments, the image decisioner 318 may comprise firmware or may be manifested as a combination of hardware, firmware and software. In still other embodiments, the image decisioner 318 and the processor 324 may work together in tandem.

Figure 4:
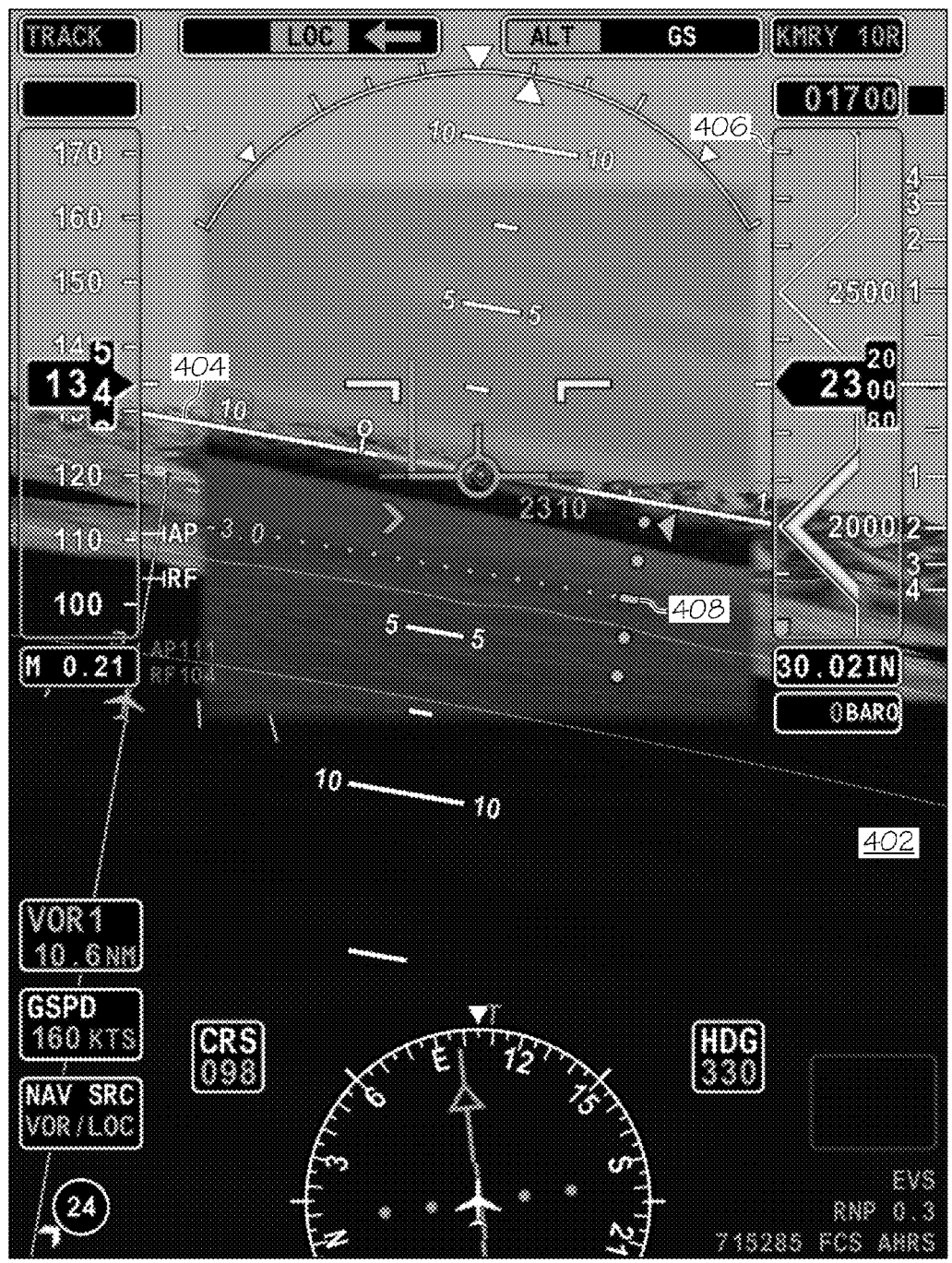
FIG. 4 is an EVS image augmented with portions of an SVS image in accordance with an exemplary embodiment.

FIG. 4 is an exemplary picture of the display screen 322 displaying an enhanced image 402, selected features of a synthetic image 404, and various iconic data 406. Synthetic features include the grid lines 408. These gridlines 408 rendered in both the SVS image and continued into the EVS only portion of the image. The preferred SVS grid line color can be generally darker as the SVS image can be readily generated to allow a darker color grid lines to be rendered with minimum display clutter. The EVS sensor portion of image modulated by the external environment can change significantly. In this example (FIG. 4), a substantially white color grid line is used to augment the EVS portion of the image since the image is darker, making the darker grid lines on the SVS image difficult to visualize when overlaid onto the EVS portion of the image. Here, the grid lines within the EVS image window are displayed with brighter color different from the grid lines outside the window in SVS display areas.

Figure 5:
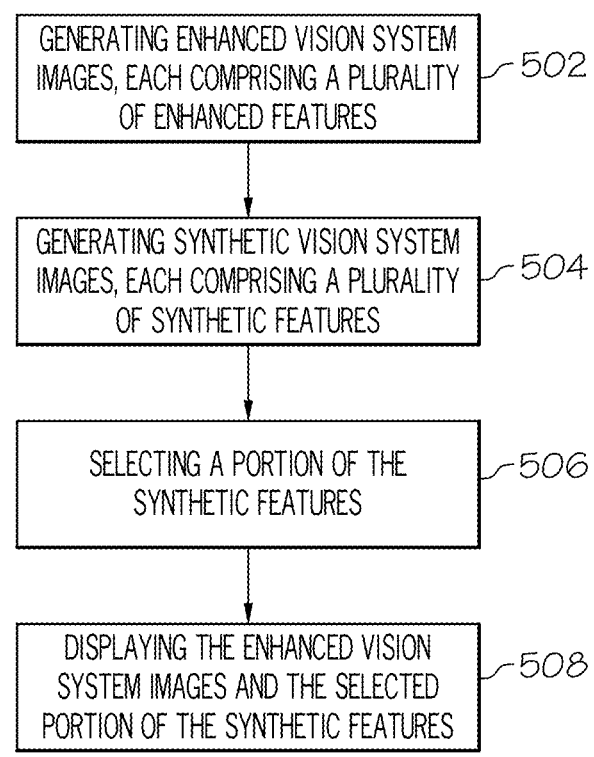
FIG. 5 is a flow diagram of a method for generating a selected features of an SVS image augmenting an EVS image, in accordance with an exemplary embodiment.

FIG. 5 is a flow diagram of a method of operating the vehicle display system 310 in accordance with an exemplary embodiment. In an exemplary embodiment, the EV system 312 generates 502 EVS images, each comprising a plurality of enhanced features in response to data supplied by the enhanced image sensor. The generation of EV images 502 comprises, for example, the generation of infrared images or millimeter-wave images. In the same timeframe, an SVS database (not shown) containing information regarding terrain and objects for a travel path of the vehicle are accessed and SVS images, each including a plurality of synthetic features, are generated 504 based on the information accessed from the SVS database, and travel conditions provided by the GPS/avionics 314. Travel conditions provided by the GPS/avionics 406 may include information such as aircraft position, heading, attitude, flight plan information of the vehicle, and flight information such as present altitude, speed, pitch, roll, and position. A portion of the SVS features are selected 506. The processor then aligns the EVS features with the portion of the selected SVS features for display by the display unit 320 on the display screen 322.

The process of selecting portions of the SVS features may be accomplished by the pilot of the aircraft, determined by considering the operational status of the aircraft, or be predetermined by the vehicle display system 310.

While the format, including the intensity (brightness) for example, of the EVS image is predetermined, the format of the SVS features may be modified to improve the clarity of the image and recognition by the pilot. For example, the intensity of the SVS features may be increased or decreased depending on the intensity of the EVS features being augmented. Additionally, the SVS features in EVS image regions may be a first color with the SVS features being a second color in the SVS only display region. Transparency and shape are further examples of the SVS feature format that may be modified to improve recognition by the pilot when used to augment the EVS images.

It is noted the SVS features used for augmentation may include, for example, terrain grid lines, obstacles, geographic data, and a target, for example, in the case of an attack aircraft.

Additionally, a determination may be made that a specific EVS feature satisfies a threshold, e.g., intensity, and if so, the selected SVS feature may be omitted from being displayed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims.

What is claimed is:

1. A display system for displaying images, comprising:
   an enhanced vision system configured to generate a stream of enhanced vision images, each enhanced vision image comprising a plurality of enhanced features;
   a synthetic vision system database configured to generate a stream of synthetic vision images, each synthetic vision image comprising a plurality of synthetic features;
   a processor coupled to the enhanced vision system and the synthetic vision system and configured to:
      select a portion of the synthetic features; and
   determine if one of the enhanced features corresponding to one of the selected synthetic features satisfies a threshold; and omit the display of the selected synthetic feature corresponding to the enhanced feature satisfying the threshold
      align the portion of selected synthetic features and the enhanced vision images; and
   a display coupled to the processor and configured to display the aligned enhanced vision images and the selected synthetic features.

2. The display system of claim 1 further comprising selecting a first format for the selected synthetic features, and a second format for the synthetic features within the enhanced vision image.

3. The display system of claim 2 wherein the changing step comprises changing the first format includes changing one of the formats selected from the group consisting of intensity, color, transparency, or shape.

4. An aircraft display system for displaying images to an aircrew of an aircraft, comprising:
   an enhanced vision system configured to generate enhanced vision images;
   a synthetic vision database containing information regarding lighting for a landing approach path of the aircraft;
   a synthetic vision system configured to obtain information from the synthetic vision database for generating synthetic vision images of the lighting based on flight conditions of the aircraft;
   a processor coupled to the enhanced vision system and the synthetic vision system and configured to:
      select a portion of the synthetic features; and determine if one of the enhanced features corresponding to one of the selected synthetic features satisfies a threshold; and omit the display of the selected synthetic feature corresponding to the enhanced feature satisfying the threshold; and align the portion of selected synthetic features and the enhanced vision images; and
   a display configured to display the aligned enhanced vision images and the selected portion of the synthetic images.

5. The aircraft display system of claim 4, wherein the processor is further configured to select the synthetic features in response to an input from the aircrew.

6. The aircraft display system of claim 4, wherein the processor is further configured to select the synthetic features in response to the operational status of the aircraft.

7. The aircraft display system of claim 4, wherein the processor is further configured to select the synthetic features in response to predetermined factors.

8. The aircraft display system of claim 4 wherein the processor is further configured to change the format of the synthetic features in consideration of the format of the enhanced features.

9. The aircraft display system of claim 8 wherein the processor is further configured to change at least one of the formats selected from the group consisting of color, transparency, or shape.

10. The aircraft display system of claim 4 wherein the processor is further configured to select a plurality of grid lines.

11. The aircraft display system of claim 4 wherein the processor is further configured to select one of the synthetic features selected from the group consisting of terrain features, obstacles, a target of interest, or geographic data.

12. A method for displaying images to an aircrew member of an aircraft, comprising:
   generating enhanced vision system images, each comprising a plurality of enhanced features;
   generating synthetic vision system images, each comprising a plurality of synthetic features;
   selecting a portion of the synthetic features; and determining if one of the enhanced features corresponding to one of the selected synthetic features satisfies a threshold; and omitting the display of the selected synthetic feature corresponding to the enhanced feature satisfying the threshold; and aligning the portion of selected synthetic features and the enhanced vision images; and
   displaying the aligned enhanced vision system images and the selected portion of the synthetic features.

13. The method of claim 12 wherein the selecting step comprises:
   selecting the portion of the synthetic features by the aircrew member.

14. The method of claim 12 wherein the selecting step comprises:
   selecting the portion of the synthetic features in accordance with the operational status of the aircraft and preselected features.

15. The method of claim 12 further comprising:
   changing the format for at least some of the selected portion of the synthetic features corresponding to the enhanced features being displayed.

16. The method of claim 15 wherein the changing step comprises
   changing at least one of the color, transparency, or shape.

17. The method of claim 12 wherein the selected portion of the synthetic features comprises:
   a plurality of grid lines.

18. The method of claim 12 wherein the selected portion of the synthetic features comprises:
  a plurality of terrain and obstacle features.

19. The method of claim 12 wherein the selected portion of the synthetic features comprises:
  a target of interest comprising data stored in the database or uploaded from a datalink.

\* \* \* \* \*